(12) United States Patent
Kanemaki et al.

(10) Patent No.: US 9,826,314 B2
(45) Date of Patent: Nov. 21, 2017

(54) ELECTRONIC APPARATUS

(71) Applicant: KYOCERA Corporation, Kyoto-shi, Kyoto (JP)

(72) Inventors: Yasuhito Kanemaki, Katano (JP); Keiichi Nagoshi, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/970,886

(22) Filed: Dec. 16, 2015

(65) Prior Publication Data

US 2016/0100255 A1    Apr. 7, 2016

Related U.S. Application Data

(63) Continuation of application No. PCT/JP2014/066659, filed on Jun. 24, 2014.

(30) Foreign Application Priority Data

Jun. 26, 2013 (JP) ................. 2013-134320

(51) Int. Cl.
*H04R 17/00* (2006.01)
*H04M 1/03* (2006.01)
*H04R 7/04* (2006.01)
*H04R 1/02* (2006.01)

(52) U.S. Cl.
CPC .............. *H04R 17/00* (2013.01); *H04M 1/03* (2013.01); *H04R 1/023* (2013.01); *H04R 7/045* (2013.01); *H04R 1/021* (2013.01); *H04R 2460/13* (2013.01); *H04R 2499/11* (2013.01)

(58) Field of Classification Search
CPC ....................... H04R 2440/00–2440/07; H04R 2217/00–2217/03; H04R 1/02; H04R 1/025; H04R 1/026; H04R 7/04
USPC .................. 381/152, 190, 388, 431
See application file for complete search history.

(56) References Cited

U.S. PATENT DOCUMENTS

| | | | |
|---|---|---|---|
| 6,320,967 B1 * | 11/2001 | Azima ................ | B42D 15/022 381/152 |
| 6,332,029 B1 * | 12/2001 | Azima ................ | B42D 15/022 381/152 |
| 8,885,862 B2 * | 11/2014 | Rossing .................. | H04R 1/26 381/333 |
| 9,426,580 B2 * | 8/2016 | Watanabe ............. | H04R 7/045 |
| 2007/0110264 A1 * | 5/2007 | Bachmann ............. | H04R 5/023 381/152 |

* cited by examiner

*Primary Examiner* — Suhan Ni
(74) *Attorney, Agent, or Firm* — Procopio Cory Hargreaves and Savitch LLP (57) ABSTRACT

An electronic apparatus comprises a cover panel, a piezoelectric vibration element located on a rear surface being opposite to an exposed surface of the cover panel, and a drive module driving the piezoelectric vibration element based on a sound signal. The rear surface comprises a first region where the piezoelectric vibration element is disposed. The first region is located closer to a side of the exposed surface than a second region in the rear surface.

12 Claims, 12 Drawing Sheets

ELECTRONIC APPARATUS

The present application is a continuation based on PCT Application No. PCT/JP2014/066659, filed on Jun. 24, 2014, which claims the benefit of Japanese Application No. 2013-134320, filed on Jun. 26, 2013. PCT Application No. PCT/JP2014/066659 is entitled "ELECTRONIC INSTRUMENT" and Japanese Application No. 2013-134320 is entitled "ELECTRONIC APPARATUS". The contents of which are incorporated by reference herein in their entirety.

TECHNICAL FIELD

An embodiment of the present disclosure relates to an electronic apparatus for transmitting a sound to a user.

BACKGROUND ART

Various technologies have conventionally been proposed for electronic apparatuses.

SUMMARY

An electronic apparatus is disclosed. In one embodiment, an electronic apparatus comprise a cover panel a piezoelectric vibration element configured to be located on a rear surface being opposite to an exposed surface of the cover panel and a drive module configured to vibrate the piezoelectric vibration element based on a sound signal. The rear surface comprises a first region where the piezoelectric vibration element is disposed. The first region is located closer to a side of the exposed surface than a second region in the rear surface.

DESCRIPTION OF EMBODIMENT

External Appearance of Electronic Apparatus

An electronic apparatus 100 according to one embodiment shown in drawings is a mobile phone, for example.

Figure 1:
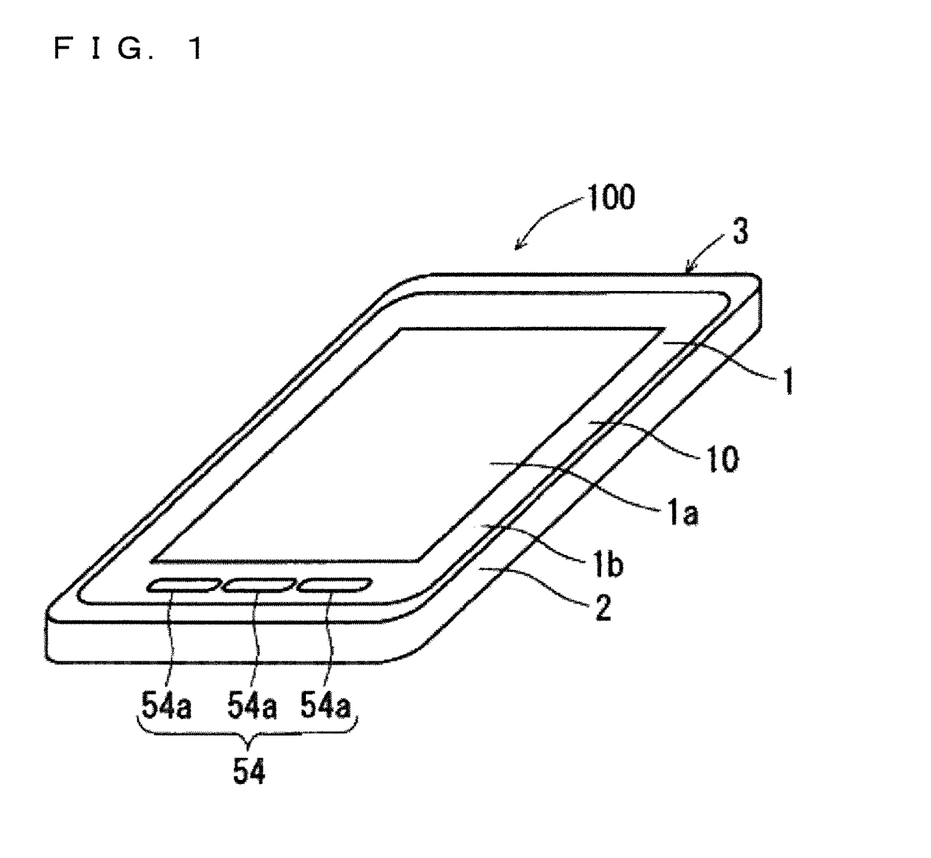
FIG. 1 illustrates a perspective view showing an external appearance of an electronic apparatus.

As shown in FIG. 1, the electronic apparatus 100 includes a cover panel 1 and a case part 2. The cover panel 1 and the case part 2 are combined to constitute an apparatus case 3 having a plate shape substantially rectangular in a plan view.

The cover panel 1 has a substantially rectangular shape in a plan view and forms a part in a front part of the electronic apparatus 100 other than a peripheral part thereof.

The cover panel 1 is formed of, for example, a transparent glass, a transparent acrylic resin, or a sapphire crystal. A problem that the cover panel hardly transmits vibrations of a piezoelectric vibration element easily occurs when the cover panel formed of sapphire crystal is used.

The case part 2 forms the peripheral part of the front part, a lateral part, and a rear part of the electronic apparatus 100. The case part 2 is formed of, for example, a polycarbonate resin.

The cover panel 1 is provided with a display part 1a on which various types of information such as characters, symbols, and diagrams are displayed. The display part 1a has, for example, a rectangular shape in a plan view. A peripheral part 1b that surrounds a display part 1a in the cover panel 1 is black through, for example, application of a film. The peripheral part 1b accordingly serves as a non-display part on which no information is displayed. Attached to an inner main surface of the cover panel 1 is a touch panel 53, which will be described below. The user can provide various instructions to the electronic apparatus 100 by operating the display part 1a of the cover panel 1 with his/her finger.

Figure 2:
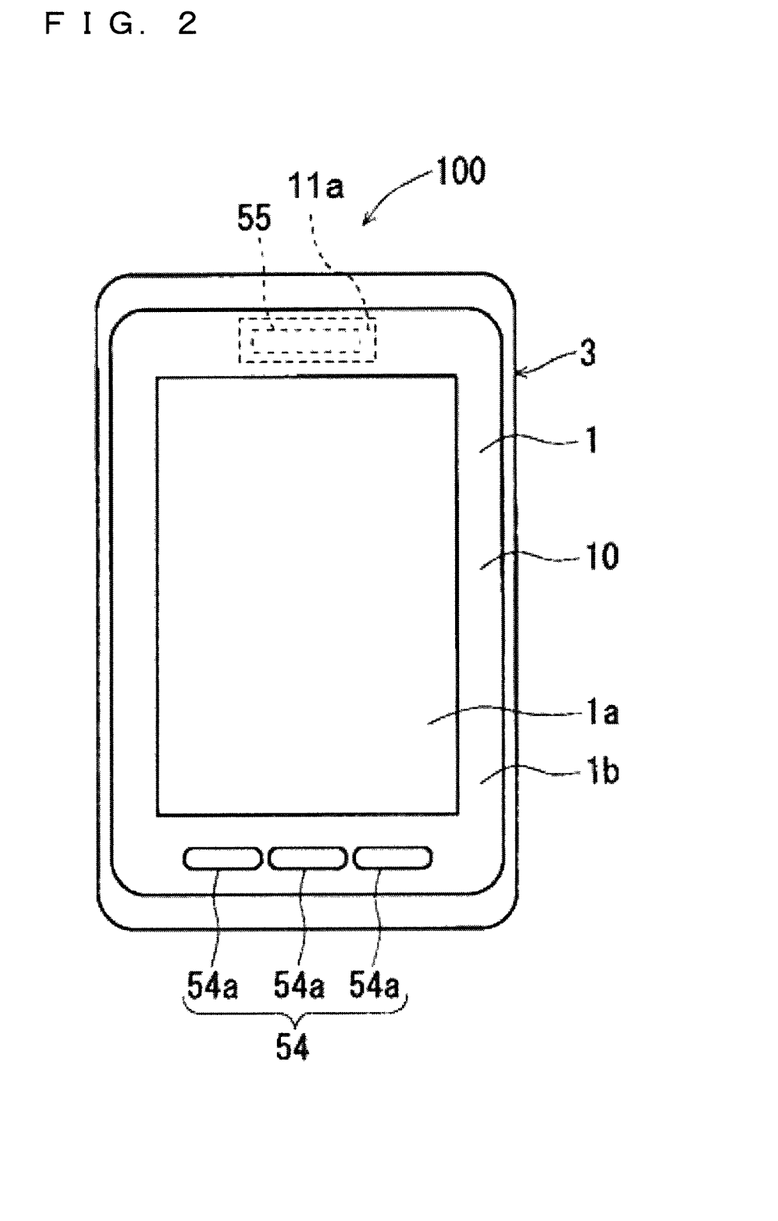
FIG. 2 illustrates a front view showing the external appearance of the electronic apparatus.

Provided inside the apparatus case 3 is an operation module 54 including a plurality of operation buttons 54a. The plurality of operation buttons 54a are so-called "hard keys". A surface of the respective operation buttons 54a is exposed from a lower-side end portion of an outer main surface 10 of the cover panel 1. Made in the lower-side end portion of the cover panel 1 are holes for exposing the plurality of operation buttons 54a. As illustrated in FIG. 2, provided inside the apparatus case 3 is a piezoelectric vibration element 55 described below. A material constituting the operation buttons 54a is, for example, glass or resin. Other materials that may be used for the operation buttons 54a include crystalline materials such as sapphire, diamond, zirconia, titania, crystal, lithium tantalite, and aluminum oxynitride.

The number of plurality of operation buttons 54a of the operation module 54 may be appropriately changed.

Although the electronic apparatus 100 is provided with the plurality of operation buttons 54a, which are the "hard keys", the electronic apparatus 100 may display operations buttons as soft keys, for example, instead of the plurality of operations buttons 54a.

Figure 3:
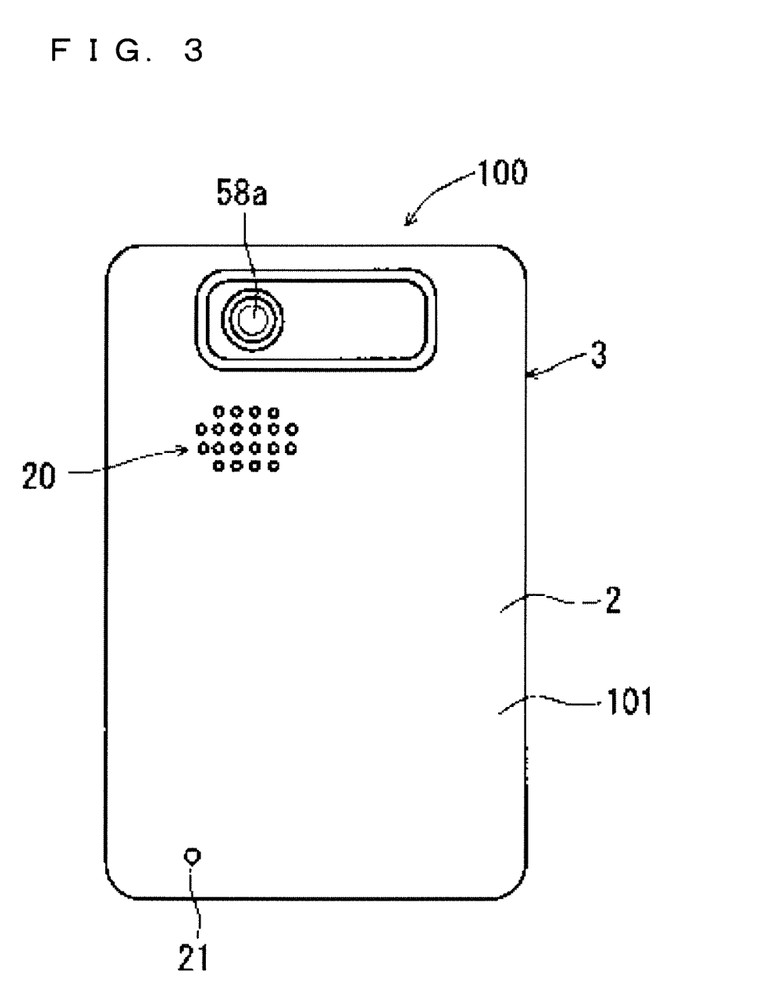
FIG. 3 illustrates a rear view showing the external appearance of the electronic apparatus.

As illustrated in FIG. 3, a speaker hole 20 and a microphone hole 21 are made in a rear surface 101 of the electronic apparatus 100, in other words, in a rear surface of the apparatus case 3. An imaging lens 58a which is included in an imaging module 58 described below is exposed from the rear surface 101 of the electronic apparatus 100.

Electrical Configuration of Electronic Apparatus

Figure 4:
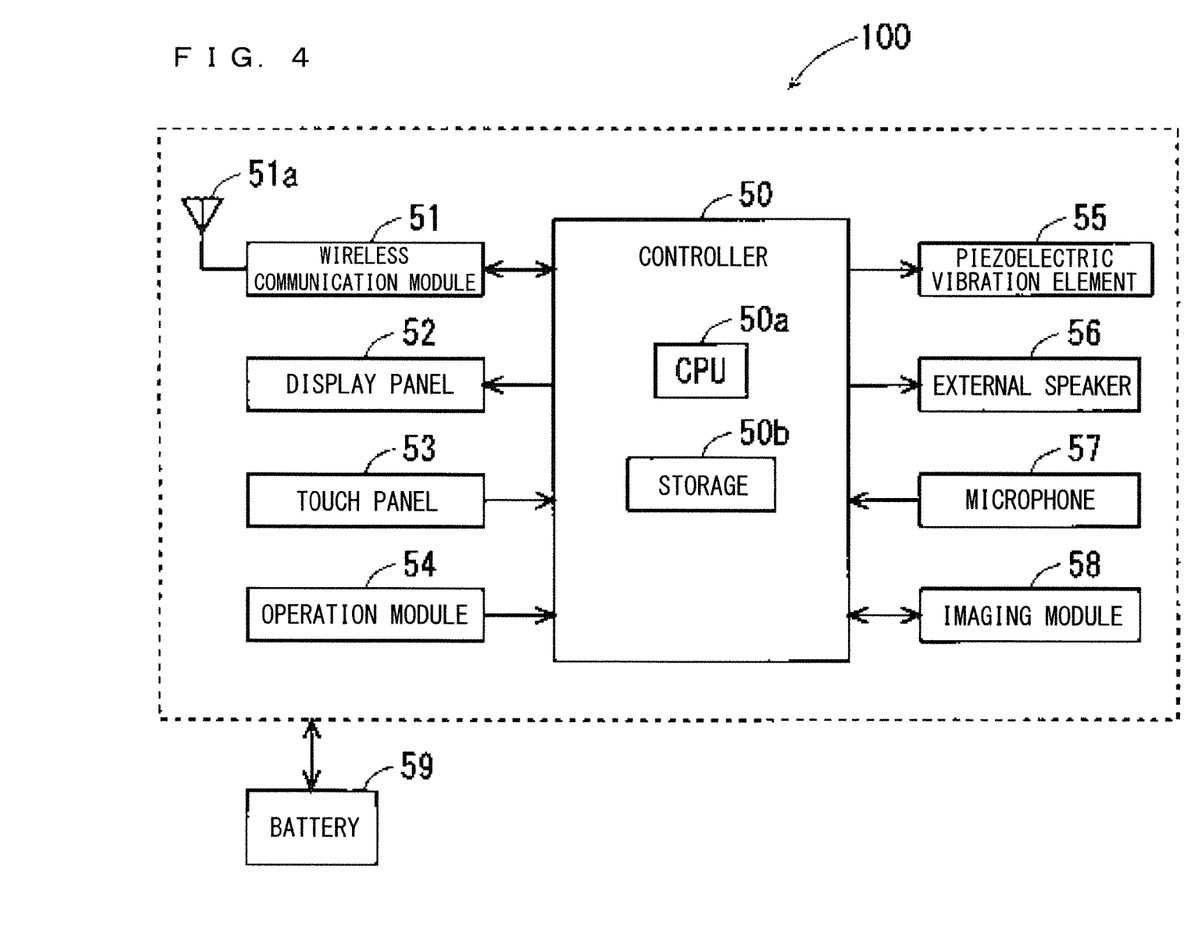
FIG. 4 illustrates a block diagram showing an electrical configuration of the electronic apparatus.

FIG. 4 is a block diagram illustrating an electrical configuration of the electronic apparatus 100. As illustrated in FIG. 4, the electronic apparatus 100 includes a control module 50, a wireless communication module 51, a display panel 52, the touch panel 53, the operation module 54, the piezoelectric vibration element 55, an external speaker 56, a microphone 57, the imaging module 58, and a battery 59. The apparatus case 3 houses these components of the electronic apparatus 100.

The control module 50 mainly includes a CPU 50a and a storage module 50b. The control module 50 can control other components of the electronic apparatus 100 to collectively manage the operation of the electronic apparatus 100. The storage module 50b is mainly configured with a ROM and a RAM. The CPU 50a can perform various programs in the storage module 50b, so that various function blocks are formed in the control module 50.

The wireless communication module 51 can receive, through an antenna 51a, a signal from a mobile phone different from the electronic apparatus 100 or a communication device such as a web server connected to Internet via a base station. The wireless communication module 51 can perform amplification processing and down-conversion processing on the received signal and then outputs a resultant signal to the control module 50. The control module 50 can perform modulation processing or other processing on the received signal that has been input, to thereby obtain a sound signal indicative of voice or music contained in the received signal. The wireless communication module 51 can also perform up-conversion processing and amplification processing on a transmission signal including the sound signal or the like that has been generated by the control module 50, to thereby wirelessly transmit the processed transmission signal from the antenna 51a. The transmission signal from the antenna 51a is received, via the base station, by a mobile phone different from the electronic apparatus 100 or a communication device connected to the Internet.

The display panel 52 is, for example, a liquid crystal display panel or an organic EL panel. The display panel 52 can display various types of information such as characters, symbols, and graphics under control of the control module 50. The information, which is to be displayed on the display panel 52, is displayed in the display part 1a of the cover panel 1 to be visible to the user of the electronic apparatus 100.

The touch panel 53 is, for example, a projected capacitive type touch panel. The touch panel 53 detects an operation performed by the user with the display part 1a of the cover panel 1. The touch panel 53 is bonded to the inner main surface of the cover panel 1. The touch panel 53 includes two sheet-like electrode sensors disposed to face each other. The two electrode sensors are bonded together with a transparent adhesive sheet.

Formed in one of the electrode sensors are a plurality of elongated X electrodes that extend in an X-axis direction (for example, the horizontal direction of the electronic apparatus 100) and are disposed parallel to one another. Formed in the other electrode sensor are a plurality of elongated Y electrodes that extend in a Y-axis direction (for example, the vertical direction of the electronic apparatus 100) and are disposed parallel to one another. When a user's finger comes into contact with the display part 1a of the cover panel 1, a capacitance between the X electrode and the Y electrode located below the contact portion changes, so that the touch panel 53 can detect the operation on the display part 1a of the cover panel 1. A change in the capacitance between the X electrode and the Y electrode, which occurs in the touch panel 53, is transmitted to the control module 50. The control module 50 can identify, based on the capacitance change, the content of the operation made on the display part 1a of the cover panel 1, and perform the operation corresponding to the identified content.

For each of the plurality of operation buttons 54a, when the user presses an operation button 54a, the operation module 54 outputs to the control module 50 an operation signal indicating that the operation button 54a has been pressed. The control module 50 identifies, based on the input operation signal, which operation button 54a of the plurality of operation buttons 54a has been operated and then performs the operation corresponding to the operation button 54a that has been operated.

The piezoelectric vibration element 55 can transmit the received sound to the user of the electronic apparatus 100. The piezoelectric vibration element 55 is vibrated by the drive voltage applied from the control module 50. The control module 50 can generate a drive voltage based on a sound signal which indicates the received sound, and then apply the drive voltage to the piezoelectric vibration element 55. The piezoelectric vibration element 55 is vibrated based on a sound signal, which indicates the received sound, by the control module 50, whereby the received sound is transmitted to the user of the electronic apparatus 100. In the above manner, the control module 50 functions as a drive module to drive the piezoelectric vibration element 55 based on the sound signal. The piezoelectric vibration element 55 will be described below in detail.

The external speaker 56 converts an electrical sound signal from the control module 50 into sound and then outputs the sound. The sound output from the external speaker 56 is output to the outside through the speaker hole 20 provided in the rear surface 101 of the electronic apparatus 100.

The microphone 57 converts the sound input from the outside of the electronic apparatus 100 into an electrical sound signal and then outputs the electrical sound signal to the control module 50. The sound from the outside of the electronic apparatus 100 is taken inside the electronic apparatus 100 through the microphone hole 21 provided in the rear surface 101 of the electronic apparatus 100 to be input to the microphone 57.

The imaging module 58 is configured with the imaging lens 58a, an image sensor, and the like. The imaging module 58 takes a still image and a moving image under the control of the control module 50.

The battery 59 outputs a power supply for the electronic apparatus 100. The power supply output from the battery 59 is supplied to respective electronic components included in the control module 50, the wireless communication module 51, and the like included in the electronic apparatus 100.

Details of Piezoelectric Vibration Element

Figure 5:
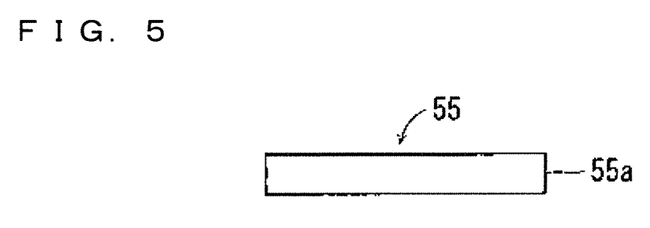
FIG. 5 illustrates a plan view showing a piezoelectric vibration element.
Figure 6:
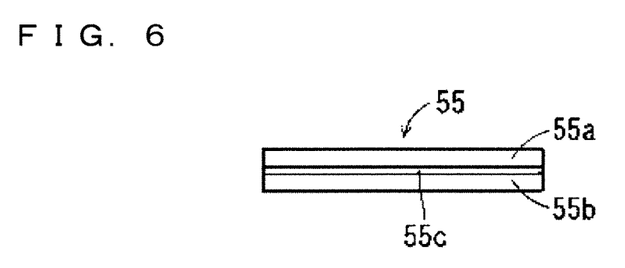
FIG. 6 illustrates a side view showing the piezoelectric vibration element.

FIGS. 5 and 6 are a top view and a side view illustrating a structure of the piezoelectric vibration element 55, respectively. As illustrated in FIGS. 5 and 6, the piezoelectric vibration element 55 has a long shape in one direction. To be specific, the piezoelectric vibration element 55 has an elongated plate shape rectangular in a plan view. The piezoelectric vibration element 55 has, for example, a bimorph structure. The piezoelectric vibration element 55 includes a first piezoelectric ceramic plate 55a and a second piezoelectric ceramic plate 55b bonded to each other with a shim material 55c therebetween.

In the piezoelectric vibration element 55, a positive voltage is applied to the first piezoelectric ceramic plate 55a and a negative voltage is applied to the second piezoelectric ceramic plate 55b, so that the first piezoelectric ceramic plate 55a expands in the long-side direction and the second piezoelectric ceramic plate 55b contracts in the long-side direction. This causes, as illustrated in FIG. 7, the piezoelectric vibration element 55 to flex toward the first piezoelectric ceramic plate 55a in a convex manner.

In the piezoelectric vibration element 55, meanwhile, a negative voltage is applied to the first piezoelectric ceramic plate 55a and a positive voltage is applied to the second piezoelectric ceramic plate 55b, so that the first piezoelectric ceramic plate 55a contracts in the long-side direction and the second piezoelectric ceramic plate 55b expands in the long-side direction. This causes, as illustrated in FIG. 8, the piezoelectric vibration element 55 to flex toward the second piezoelectric ceramic plate 55b in a convex manner.

Figure 7:
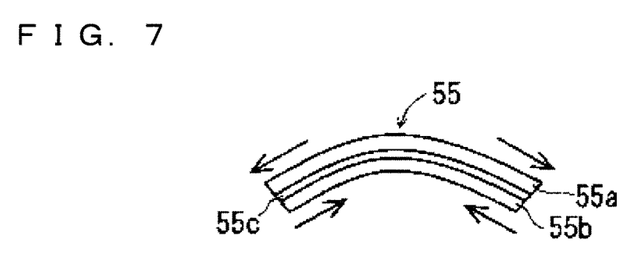
FIG. 7 illustrates a view showing a state where piezoelectric vibration element is bent.
Figure 8:
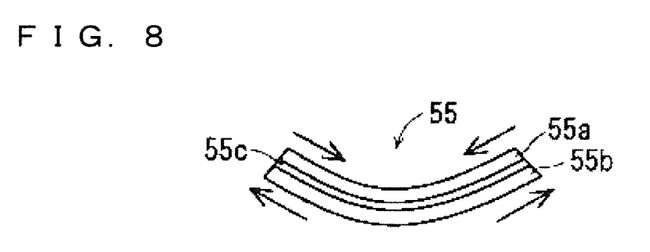
FIG. 8 illustrates another view showing the state where the piezoelectric vibration element is bent.

The piezoelectric vibration element 55 alternately enters the state of FIG. 7 and the state of FIG. 8, thereby producing flexural vibrations. The control module 50 causes an AC voltage, which alternates between positive and negative voltages, to be applied between the first piezoelectric ceramic plate 55a and the second piezoelectric ceramic plate 55b, causing the piezoelectric vibration element 55 to produce flexural vibrations.

While the piezoelectric vibration element 55 illustrated in FIGS. 5 to 7 is provided with a single structure configured with the first piezoelectric ceramic plate 55a and the second piezoelectric ceramic plate 55b that are bonded with the shim material 55c sandwiched therebetween, a plurality of the above-mentioned structures may be laminated.

Generation of Received Sound by Vibration of Piezoelectric Vibration Element In one embodiment, the piezoelectric vibration element 55 causes the cover panel 1 to vibrate, so that air conducted sound and tissue conducted sound are transmitted to the user from the cover panel 1. In other words, the vibrations of the piezoelectric vibration element 55 itself are transmitted to the cover panel 1, allowing for the transmission of air conducted sound and tissue conducted sound to the user from the cover panel 1.

Herein, the air conducted sound is the sound recognized by a human brain when a sound wave (air vibrations), which has entered the external auditory meatus (so-called "earhole"), causes an eardrum to vibrate. Meanwhile, the tissue conducted sound is the sound recognized by the human brain when an auricle is vibrated and vibrations of the auricle are transmitted to the eardrum, which causes the eardrum to vibrate. The air conducted sound and tissue conducted sound will now be described in detail.

Figure 9:
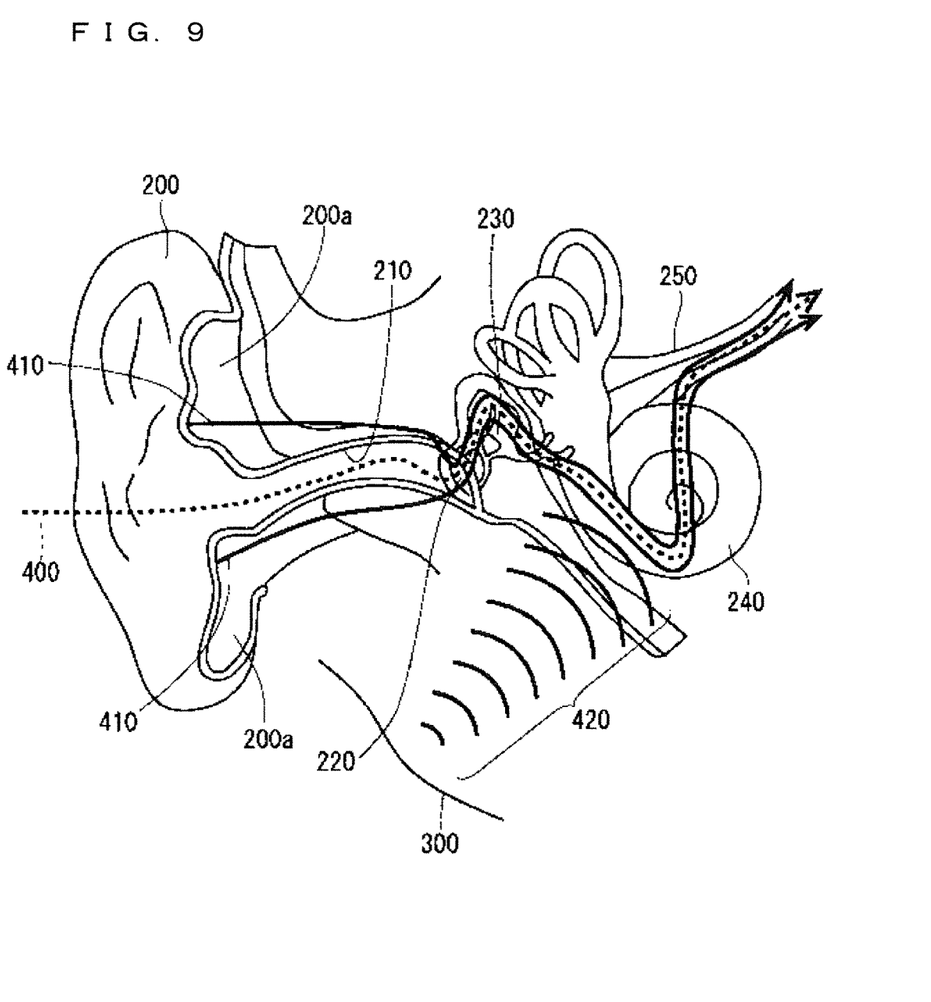
FIG. 9 illustrates a view for describing air conducted sound and tissue conducted sound.

FIG. 9 is a drawing for describing the air conducted sound and tissue conducted sound. FIG. 9 illustrates the structure of the user's ear of the electronic apparatus 100. In FIG. 9, a dashed line 400 indicates a conductive path of a sound signal (sound information) when the air conducted sound is recognized by the brain, and a solid line 410 indicates a conductive path of a sound signal when the tissue conducted sound is recognized by the brain.

When the piezoelectric vibration element 55 mounted on the cover panel 1 is vibrated based on an electrical sound signal indicative of received sound, the cover panel 1 vibrates, whereby a sound wave is output from the cover panel 1. When the user has the electronic apparatus 100 in his/her hand and brings the cover panel 1 of the electronic apparatus 100 close to an auricle 200 of the user or holds the cover panel 1 of the electronic apparatus 100 to the auricle 200 of the user, the sound wave output from the cover panel 1 enters an external auditory meatus 210. The sound wave from the cover panel 1 travels through the external auditory meatus 210 and causes an eardrum 220 to vibrate. The vibrations of the eardrum 220 are transmitted to an auditory ossicle 230, causing the auditory ossicle 230 to vibrate. Then, the vibrations of the auditory ossicle 230 are transmitted to a cochlea 240 and are then converted into an electrical signal in the cochlea 240. The electrical signal is transmitted to the brain through an auditory nerve 250, so that the brain recognizes the received sound. In this manner, the air conducted sound is transmitted from the cover panel 1 to the user.

When the user has the electronic apparatus 100 in his/her hand and holds the cover panel 1 of the electronic apparatus 100 to the auricle 200 of the user, the auricle 200 is vibrated by the cover panel 1 vibrated by the piezoelectric vibration element 55. The vibrations of the auricle 200 are transmitted to the eardrum 220, causing the eardrum 220 to vibrate. The vibrations of the eardrum 220 are transmitted to the auditory ossicle 230, causing the auditory ossicle 230 to vibrate. The vibrations of the auditory ossicle 230 are then transmitted to the cochlea 240 and are then converted into an electrical signal by the cochlea 240. The electrical signal is transmitted to the brain through the auditory nerve 250, whereby the brain recognizes the received sound. In this manner, the tissue conducted sound is transmitted from the cover panel 1 to the user. FIG. 9 also illustrates an auricular cartilage 200a inside the auricle 200.

Bone-conducted sound (also referred to as "bone conduction sound") is the sound recognized by the human brain when the skull is vibrated and the vibrations of the skull directly stimulate the inner ear such as the cochlea. In FIG. 9, illustrating the case in which, for example, a mandibular bone 300 is vibrated, a plurality of arcs 420 indicate a transmission path of a sound signal when the bone conduction sound is recognized by the brain.

As described above, in the electronic apparatus 100 according to one embodiment, the piezoelectric vibration element 55 appropriately vibrates the cover panel 1 on the front surface, in other words, the piezoelectric vibration element 55 appropriately transmits the vibrations of the piezoelectric vibration element 55 itself to the cover panel 1 on the front side, so that the air conducted sound and tissue conducted sound can be transmitted from the cover panel 1 to the user of the electronic apparatus 100. The structure of the piezoelectric vibration element 55 according to one embodiment is contrived to appropriately transmit the air conducted sound and tissue conducted sound to the user. Various advantages can be achieved by configuring the electronic apparatus 100 to transmit the air conducted sound and tissue conducted sound to the user.

For large ambient noise, the user can make it difficult to hear the ambient noise by putting his/her ear strongly to the cover panel 1 while turning up the volume of the tissue conducted sound. This enables the user to appropriately have a telephone conversation even if the ambient noise is large.

Even while wearing earplugs or earphones in his/her ears, the user can recognize the received sound from the electronic apparatus 100 by holding the cover panel 1 to his/her ear (more specifically, auricle). Alternatively, even while wearing headphone in his/her ears, the user can recognize the received sound from the electronic apparatus 100 by holding the cover panel 1 to the headphones.

Position at which Piezoelectric Vibration Element is Disposed

Figure 10:
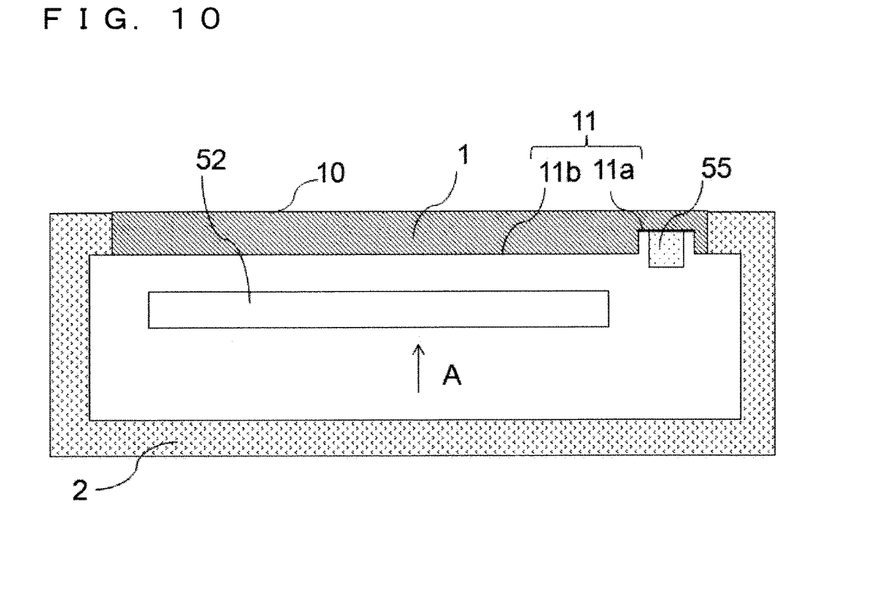
FIG. 10 illustrates a sectional view of the electronic apparatus.
Figure 11:
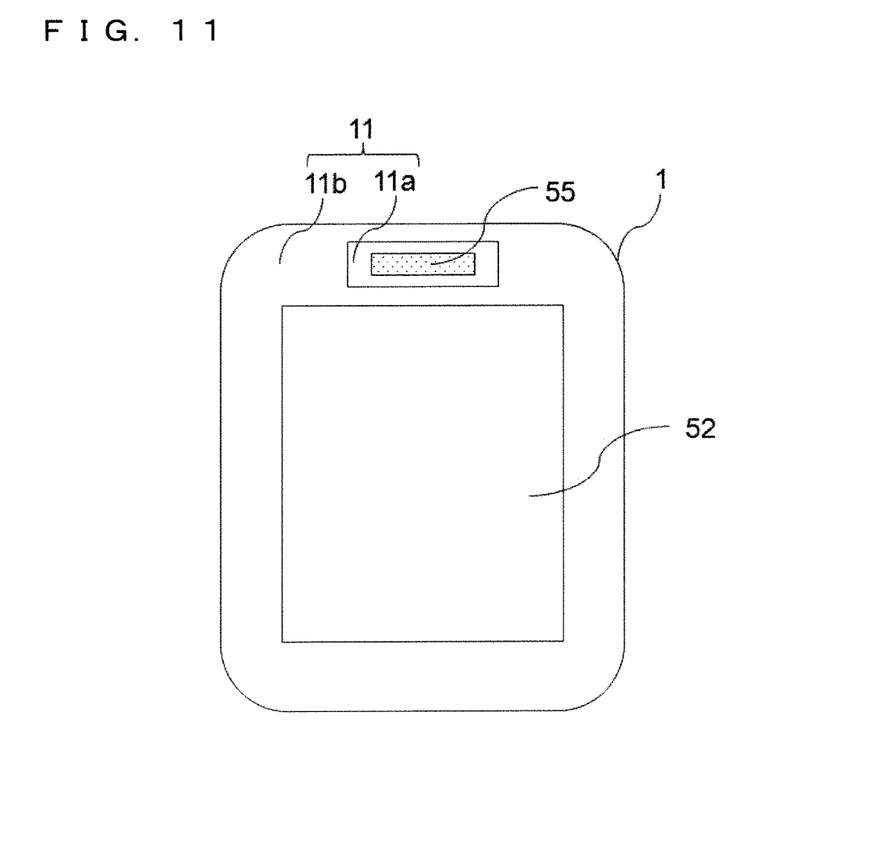
FIG. 11 illustrates a plan view showing a cover panel and a display panel when the electronic apparatus is viewed from a direction A shown in FIG. 10.

FIG. 10 is a view showing a cross-sectional structure in the vertical direction (long-side direction) of the electronic apparatus 100. FIG. 11 is a plan view of the cover panel 1 and the display panel 52 when viewed from a rear surface 11 side of the exposed surface 10 of the cover panel 1 (viewed from a direction A in FIG. 10). A touch panel (not shown) is bonded to the rear surface 11 of the exposed surface 10 so as to face the display part 1a of the cover panel 1. The display panel 52 being a display member is disposed to face the cover panel 1 and the touch panel. The touch panel is thus located between the cover panel 1 and the display panel 52. The part of the exposed surface 10 in the cover panel 1, which overlaps with the display panel 52 in a plan view, serves as the display part 1a (refer to FIGS. 1 and 2).

There may be a gap between the touch panel and the display panel 52, or the touch panel may be in contact with the display panel 52. Herein, when the cover panel 1 is pressed with the finger or the like by the user and then the cover panel 1 flexes toward the display panel 52 side, the cover panel 1 may contact the display panel 52 (to be exact, the touch panel may contact the display panel 52), thereby causing a disturbance of the display on the display panel 52. When the gap is located between the touch panel and the display panel 52 in the manner of one embodiment, the disturbance of the display panel 52 can be suppressed even when the cover panel 1 flexes toward the display panel 52 side.

When the touch panel is formed over the entire rear surface 11 of the cover panel 1, the piezoelectric vibration element 55 may be disposed on the rear surface 11 of the cover panel 1 with the touch panel therebetween.

The input operation may be performed on the electronic apparatus 100 only with the hard keys without providing the touch panel in the electronic apparatus 100. In the above case, the hard keys may be provided on the front surface or the like of the electronic apparatus 100. In the above case, the cover panel 1 and the display panel 52 may be disposed to face each other with a space therebetween or face in contact with each other.

Provided inside the apparatus case 3 is a printed board on which various components such as the CPU 50a and the microphone 57 are mounted. The printed board is disposed to face the display panel 52 inside the electronic apparatus 100.

The piezoelectric vibration element 55 is bonded to an installation region (a first region) 11a in the rear surface 11 of the cover panel 1 with an adhesive member such as an adhesive or a double-sided tape. The installation region 11a is, as illustrated in FIG. 10, located closer to the exposed surface 10 side than a region 11b (a second region) other than the installation region 11a in the rear surface 11. As illustrated in FIGS. 10 and 11, the installation region 11a is a bottom surface of a recess provided in the rear surface 11. Occupancy ratio of the installation region 11a to the whole rear surface 11 is smaller than that of the region 11b to the whole rear surface 11. In this manner, the occupancy ratio of the installation region 11a in the rear surface 11 is reduced, so that strength of the cover panel 1 can be maintained.

When the installation region 11a has a rectangular shape in a plan view, the installation region 11a may be disposed such that the long-side direction of the installation region 11a coincides with the horizontal direction of the cover panel 1. Such a configuration allows the display part 1a of the cover panel 1 to be lengthened in the vertical direction while suppressing the length of the electronic apparatus 100 in the vertical direction.

When the cover panel 1 is made of sapphire, for example, the installation region 11a is formed by a method such as wet etching, dry etching, or sand blast.

In one example of FIG. 10, a length from the second region 11b to the first region 11a in a thickness direction of the cover panel 1, that is to say, a depth of the recess provided in the rear surface 11 is 1 mm to 2 mm. A thickness of the piezoelectric vibration element 55 is 0.7 mm to 0.8 mm. A thickness between the first region 11a and the exposed surface 10 is 0.3 mm to 1 mm.

The user brings a vicinity of a region, which faces the installation region 11a, in the exposed surface 10 of the cover panel 1 close to his/her ear. Since the thickness between the installation region 11a and the exposed surface 10 is thin enough, even when the cover panel 1 is made of reinforced glass, sapphire, or the like, the vibrations from the piezoelectric vibration element 55 can be easily transmitted to the exposed surface 10 side. Accordingly, the user can catch the sound sufficiently.

Figure 12:
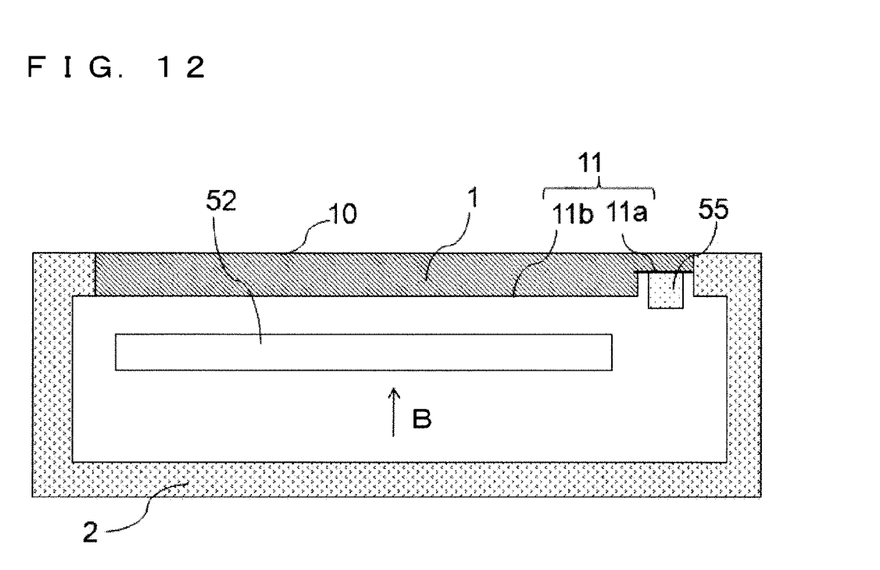
FIG. 12 illustrates a sectional view of the electronic apparatus.
Figure 13:
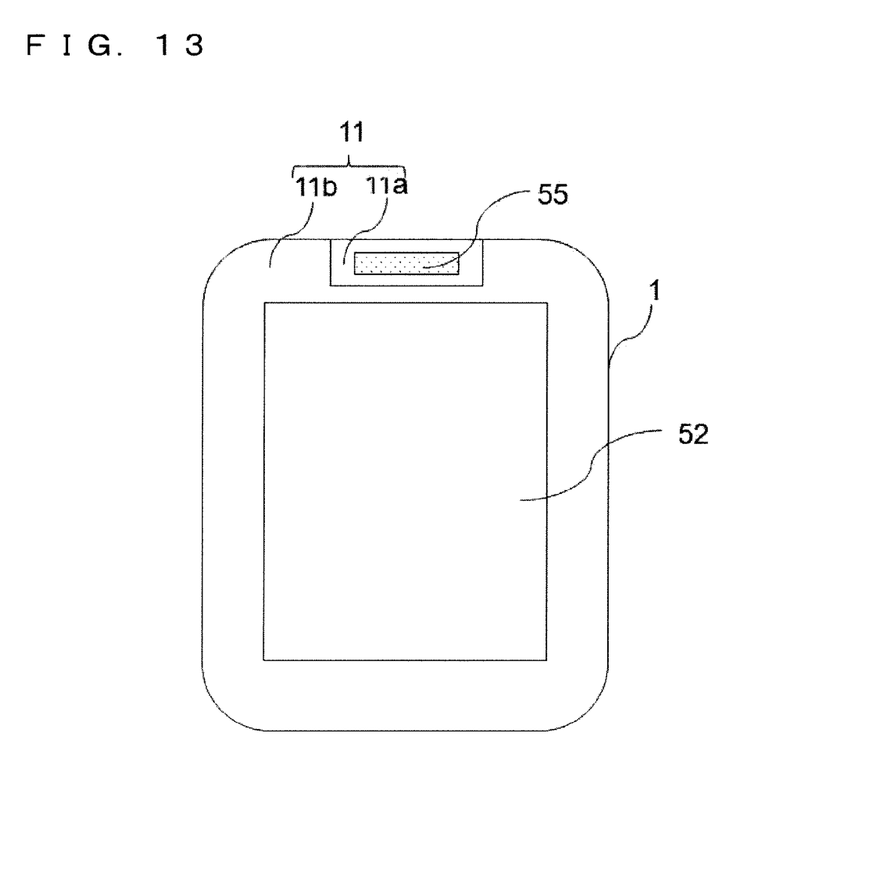
FIG. 13 illustrates a plan view showing the cover panel and the display panel when the electronic apparatus is viewed from a direction B shown in FIG. 12.

FIG. 12 illustrates a cross-sectional structure in the vertical direction of one modification example of the electronic apparatus 100. FIG. 13 is a plan view of the cover panel 1 and the display panel 52 illustrated in FIG. 12 when viewed from the rear surface 11 side of the exposed surface 10 of the cover panel 1 (viewed from a direction B in FIG. 12).

In FIGS. 12 and 13, the installation region 11a and the piezoelectric vibration element 55 are located closer to the case part 2 compared to the installation region 11a illustrated in FIGS. 10 and 11. Specifically, the installation region 11a reaches an edge side of the rear surface 11 of the cover panel 1 and is disposed along the edge side. Accordingly, the piezoelectric vibration element 55 is also disposed close to the case part 2.

Figure 14:
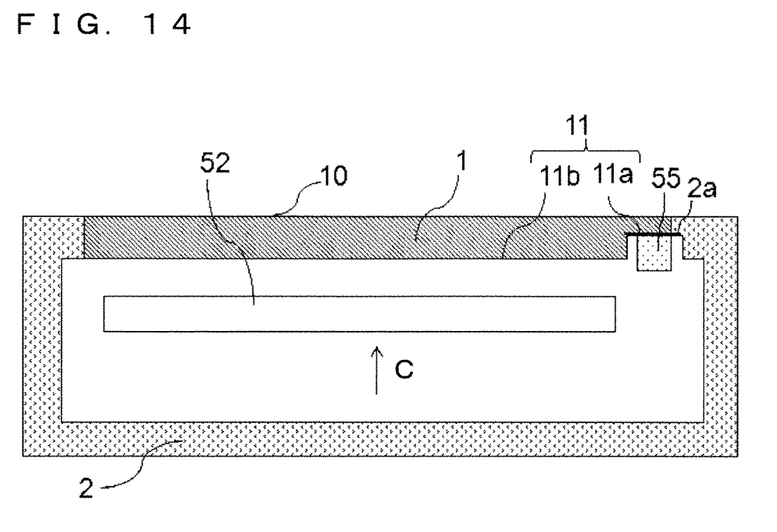
FIG. 14 illustrates a sectional view of the electronic apparatus.
Figure 15:
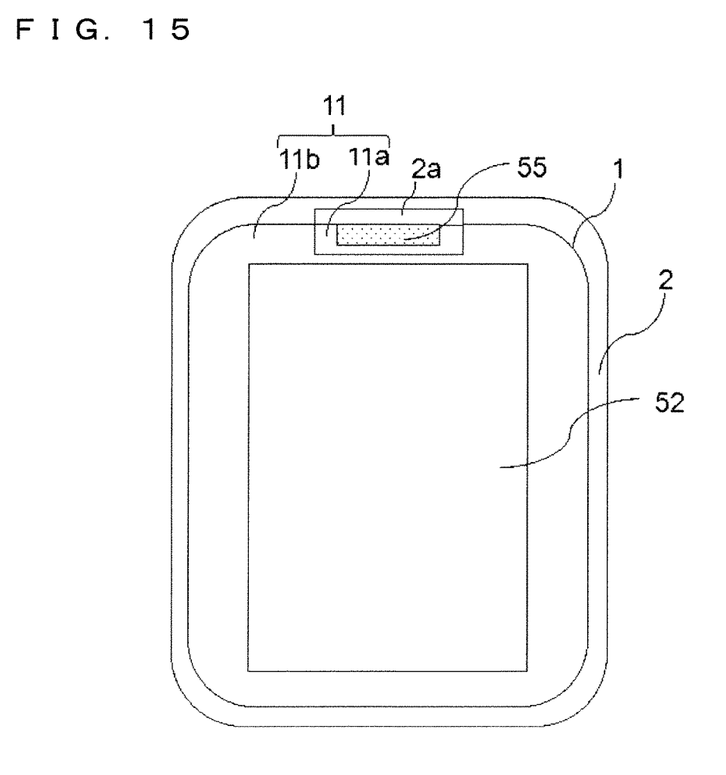
FIG. 15 illustrates a plan view showing the cover panel, the display panel, and a case part when the electronic apparatus is viewed from a direction C shown in FIG. 14.

FIG. 14 illustrates a cross-sectional structure in the vertical direction of another modification example of the electronic apparatus 100. FIG. 15 is a plan view of the cover panel 1 and the display panel 52 illustrated in FIG. 14 when viewed from the rear surface 11 side of the exposed surface 10 of the cover panel 1 (viewed from a direction C in FIG. 14).

In FIGS. 14 and 15, the piezoelectric vibration element 55 is located even closer to the case part 2 side compared to the installation region 11a illustrated in FIGS. 12 and 13. Specifically, in FIGS. 14 and 15, the installation region 11a reaches the edge side of the rear surface 11 and is disposed along the edge side. The piezoelectric vibration element 55 reaches an edge side of the installation region 11a and is disposed along the edge side of the installation region 11a.

In FIGS. 14 and 15, a region 2a may be provided in an inner wall surface of the case part 2 to form the same flat surface with the installation region 11a. The region 2a is located closer to the exposed surface 10 side of the case part 2 compared to the other region of the inner wall surface of the case part 2. By providing the region 2a in the case part 2, the region 2a can also transmit the vibrations of the piezoelectric vibration element 55. Accordingly, the sound can be appropriately transmitted to the user. Especially when the case part 2 is made of a material, such as acrylic resin, having lower rigidity than the cover panel 1, the vibrations can be transmitted more efficiently.

In the above example, the piezoelectric vibration element 55 is disposed so as not to overlap with the display panel 52 in a plan view. The reason is that when the piezoelectric vibration element 55 is disposed to overlap with the display panel 52, the piezoelectric vibration element 55 interferes with a display of an image or video output by the display panel 52. By arranging the piezoelectric vibration element 55 in the upper side of the cover panel 1, as in the case of FIGS. 12 to 15, than the case of FIGS. 11 and 12, a display region where the display panel 52 outputs the image can be enlarged. For example, the size of the display region is the largest in the electronic apparatus 100 illustrated in FIGS. 14 and 15, and then the electronic apparatus 100 illustrated in FIGS. 12 and 13, and the electronic apparatus 100 illustrated in FIGS. 10 and 11 the smallest.

Figure 16:
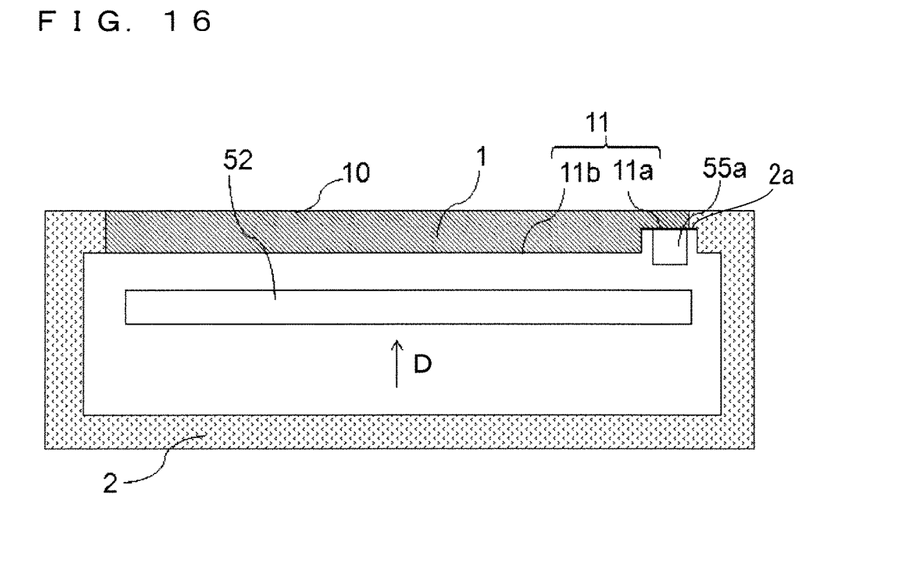
FIG. 16 illustrates a sectional view of the electronic apparatus.
Figure 17:
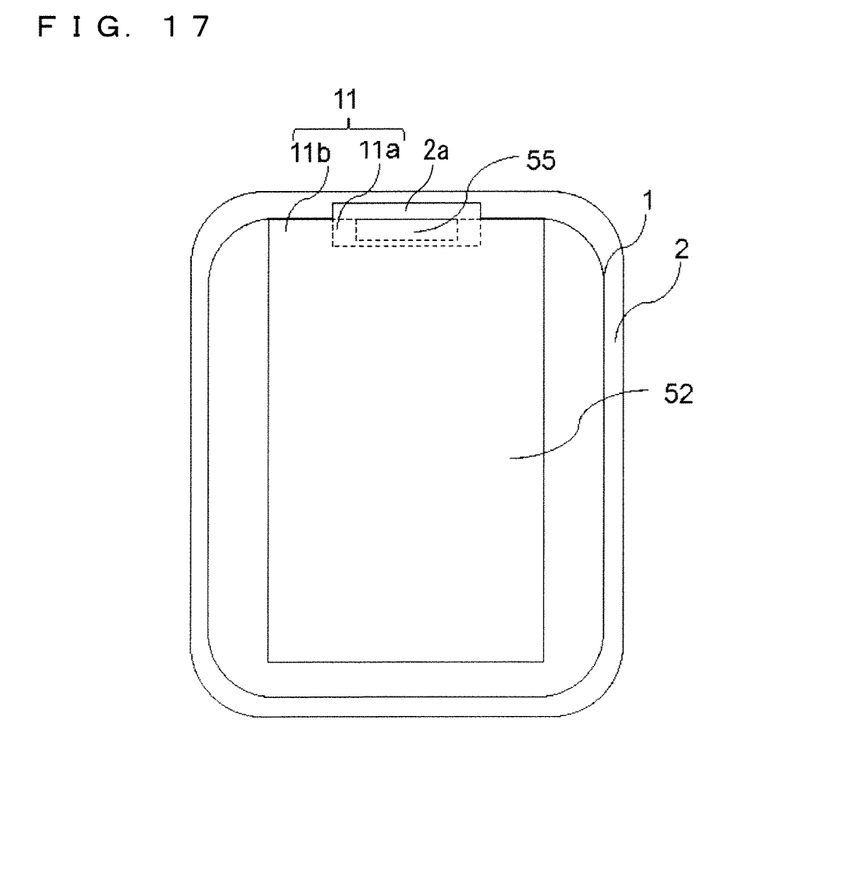
FIG. 17 illustrates a plan view showing the cover panel, the display panel, and the case part when the electronic apparatus is viewed from a direction D shown in FIG. 16.

FIGS. 16 and 17 illustrate another embodiment. FIG. 16 illustrates a cross-sectional structure in the vertical direction of another modification example of the electronic apparatus 100. FIG. 17 is a plan view of the cover panel 1 and the display panel 52 illustrated in FIG. 16 when viewed from the rear surface 11 side of the exposed surface 10 of the cover panel 1 (viewed from a direction D in FIG. 16).

The piezoelectric vibration element 55 in FIGS. 16 and 17 is transparent. A structure illustrated in FIGS. 16 and 17 is basically the same as the structure illustrated in FIGS. 14 and 15, except that the transparent piezoelectric vibration element 55 is used. Such a transparent piezoelectric vibration element 55 is made of an organic piezoelectric material such as polyvinylidene fluoride or polylactic acid instead of piezoelectric ceramic used in the normal piezoelectric vibration element 55. In addition, a transparent electrode such as ITO, for example, may be used as the electrode. Using the transparent piezoelectric vibration element 55 allows the piezoelectric vibration element 55 to be located at a position overlapping with the display panel 52 when viewed from the direction D in a plan view (in FIG. 17, the piezoelectric vibration element 55 is not actually seen from the direction D, so that it is illustrated by botted lines). In one example illustrated in FIGS. 16 and 17, the display panel 52 can be disposed in the upper side of the electronic apparatus compared to one example illustrated in FIGS. 14 and 15, so that the display region can be enlarged.

Figure 18:
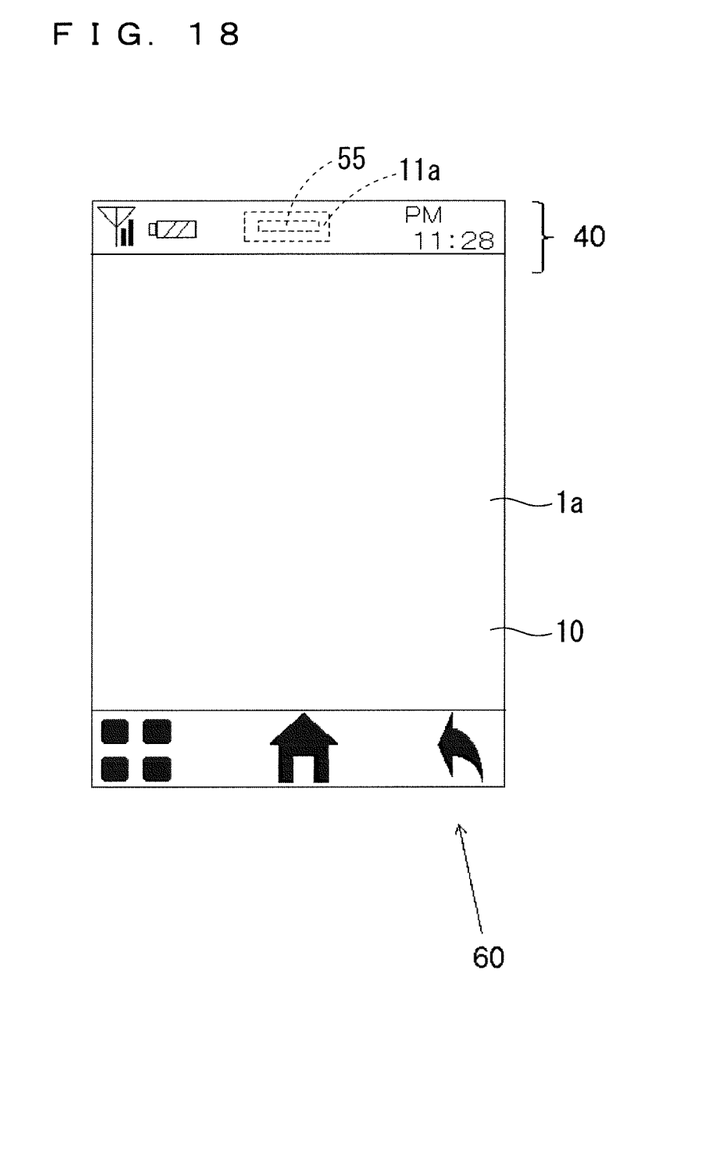
FIG. 18 illustrates a plan view showing a display screen of the electronic apparatus.

FIG. 18 illustrates another embodiment. The piezoelectric vibration element 55 may be disposed in, for example, a region 40 (a third region) in the display part 1a in the exposed surface 10 of the electronic apparatus when viewed from the exposed surface 10 side in a plan view. In FIG. 18, a remaining battery level and a communication state, for example, are indicated on a right or left side of the region 40 as a state of the electronic apparatus, however, the state of the electronic apparatus is not indicated especially near a center of the region 40 but is shown in black. In the region 40, the piezoelectric vibration element 55 is disposed to overlap with a position near the center of the region 40, for example, where the state of the electronic apparatus is not indicated, so that when the electronic apparatus is viewed from the exposed surface 10 side, the piezoelectric vibration element 55 is not visually recognized easily.

Figure 19:
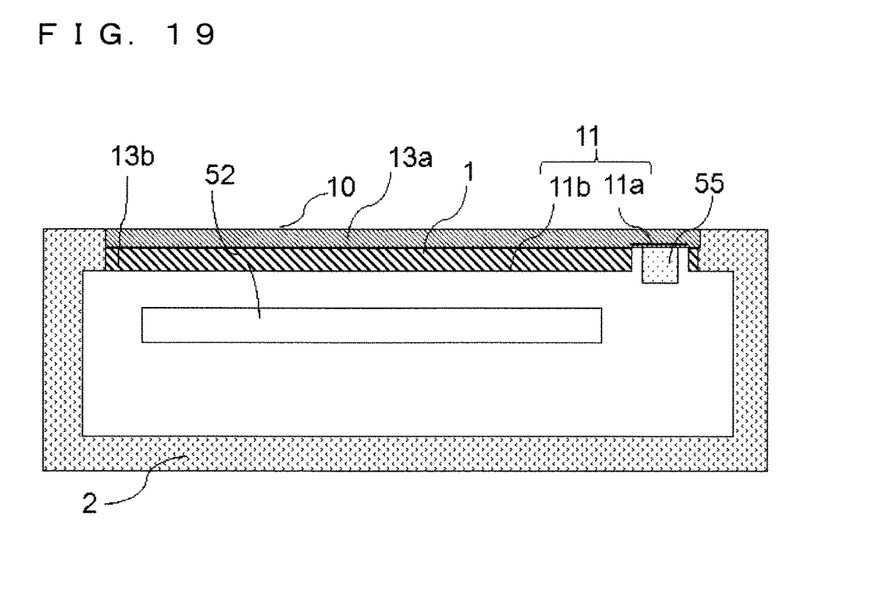
FIG. 19 illustrates a sectional view of the electronic apparatus.

FIG. 19 illustrates another embodiment. The cover panel 1 in FIG. 19 includes two boards 13a and 13b. For example, a sapphire board is used as the board 13a located at the exposed surface 10 side, and a glass board is used as the substrate 13b located at the rear surface 11 side. When the cover panel 1 provided with at least two types of laminated boards is used, the board 13a at the exposed surface 10 side can have a resistance against a flaw from outside, and the board 13b at the rear surface 11 side can have a resistance against a flex crack, for example. Accordingly, strength of the cover panel 1 can be enhanced. Moreover, in one example of FIG. 19, the piezoelectric vibration element 55 is bonded only to the board 13a at the exposed surface 10 side, so that the vibrations can be easily transmitted to the exposed surface 10.

Figure 20:
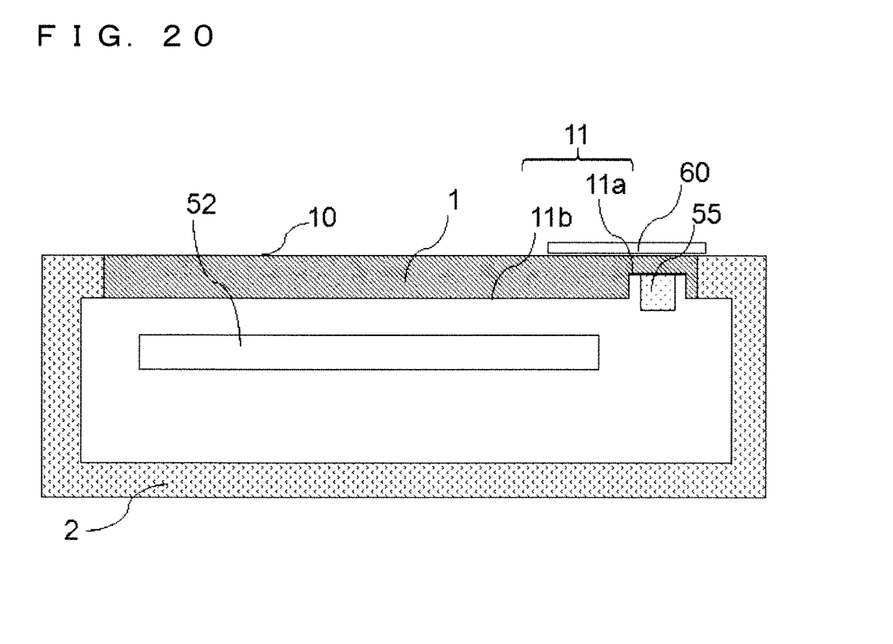
FIG. 20 illustrates a sectional view of the electronic apparatus.

In FIG. 20, an additional member 60 such as a film or another panel is provided in a region facing the installation region 11a on the exposed surface 10. The additional member 60 may be made of a transparent resin such as acrylic resin, for example. The strength of the cover panel 1 whose thickness is reduced in the first region 11a can be enhanced by providing the additional member 60. That is to say, the additional member 60 functions as a reinforcing member to reinforce the cover panel 1 from the exposed surface 10 side. Moreover, the additional member 60 can also prevent the piezoelectric vibration element 55 from being seen from the exposed surface 10, which is caused because the thickness of the caver panel 1 is reduced in the first region 11a. That is to say, the additional member 60 functions as a blindfold member to conceal the piezoelectric vibration element 55 from the exposed surface 10 side. Moreover, an organic EL film, for example, can be used as the additional member 60. The organic EL film is bonded to the region 40, which indicates the state of the electronic apparatus in FIG. 18, so that the organic EL film can indicate the state of the electronic apparatus instead and further conceal the piezoelectric vibration element 55.

Earpiece Hole (Reception Hole)

An electronic apparatus such as a mobile phone often has an earpiece hole in the cover panel 1 on the front surface so that the sound, which is output from a receiver (reception speaker) provided inside the electronic apparatus, is taken outside the electronic apparatus.

The electronic apparatus 100 according to one embodiment does not have an earpiece hole (Reception hole) in the cover panel 1 which outputs the sound. That is to say, there is no earpiece hole in the surface of the electronic apparatus 100. Accordingly, there is no need of the processing of making the earpiece hole in the cover panel 1. As a result, a manufacturing cost of the electronic apparatus 100 can be reduced, and a cost reduction of the electronic apparatus 100 can be achieved. Especially when the cover panel 1 is formed of glass, sapphire, or the like, it is hard to make the hole in the cover panel 1, so that the manufacturing cost of the electronic apparatus 100 can be further reduced by not making the earpiece hole in the cover panel 1. The strength of the cover panel 1 can be enhanced by not making the earpiece hole in the cover panel 1. Moreover, freedom in designing the front surface of the cover panel 1 is enhanced by not making the earpiece hole in the cover panel 1. Especially when the cover panel 1 occupies a large part of the front surface of the electronic apparatus 100 as one embodiment, no earpiece hole in the cover panel 1 is quite effective from a standpoint of the design. Since there is no earpiece hole in the surface of the electronic apparatus 100 in one embodiment, no problem that water, dust, or the like enters from the earpiece hole does not occur. Since the electronic apparatus 100 does not need a waterproof structure or dustproof structure for the above problem, the cost reduction of the electronic apparatus 100 can be further achieved.

In one embodiment, the vibrations of the cover panel 1 generates the received sound, so that the received sound can be appropriately transmitted to the user without the earpiece hole in the electronic apparatus 100.

The cover panel 1 according to one embodiment has hole to expose the operation buttons 54a, however, the holes which expose the operation buttons 54a may be made in the case part 2 instead of providing the holes in the cover panel 1. Alternatively, the holes may not be provided in the cover panel 1 by not forming the operation buttons 54a. According to the above configuration, there is no hole in the cover panel 1, so that the cost reduction of the electronic apparatus 100 and the freedom in designing the front surface of the cover panel 1 can be further enhanced.

Although the examples above have been given of the case where the present disclosure is applied to a mobile phone, the present disclosure is also applicable to electronic apparatuses other than mobile phones. The present disclosure is also applicable to, for example, game machines, notebook computers, portable navigation systems.

The present disclosure has been described in detail, but the above-mentioned description is illustrative in all aspects and the present invention is not intended to be limited thereto. Various modifications not exemplified are construed to be made without departing from the scope of the present invention.

The invention claimed is:

1. An electronic apparatus comprising:
   a cover panel;
   a piezoelectric vibration element configured to be located on a rear surface being opposite to an exposed surface of the cover panel; and
   a drive module configured to vibrate the piezoelectric vibration element based on a sound signal,
   wherein the rear surface comprises a first region where the piezoelectric vibration element is disposed, and the first region is located closer to a side of the exposed surface than a second region in the rear surface,
   wherein the electronic apparatus further comprises a display member, and
   wherein the piezoelectric vibration element is transparent, and the display member and the piezoelectric vibration element overlap with each other in a plan view when viewed from a side of the rear surface of the cover panel.

2. An electronic apparatus according to claim 1, wherein occupancy ratio of the first region to the whole rear surface is smaller than occupancy ratio of the second region to the whole rear surface.

3. An electronic apparatus according to claim 1, wherein the cover panel is made of sapphire crystal.

4. An electronic apparatus according to claim 1, wherein the cover panel is formed by bonding a sapphire board and a glass board, the exposed surface is a surface of the sapphire board, and the sapphire board is exposed from the first region of the rear surface.

5. An electronic apparatus according to claim 1, wherein the electronic apparatus further comprises a reinforcing member located in a region facing the first region on the exposed surface to reinforce the cover panel from the exposed surface side.

6. An electronic apparatus according to claim 1, wherein the electronic apparatus further comprises a blindfold member located in a region facing the first region on the exposed surface to conceal the piezoelectric vibration element from the exposed surface side.

7. An electronic apparatus comprising:
   a cover panel;
   a piezoelectric vibration element configured to be located on a rear surface being opposite to an exposed surface of the cover panel; and
   a drive module configured to vibrate the piezoelectric vibration element based on a sound signal,
   wherein the rear surface comprises a first region where the piezoelectric vibration element is disposed, and the first region is located closer to a side of the exposed surface than a second region in the rear surface, and
   wherein the exposed surface of the cover panel comprises a third region indicating a state of the electronic apparatus, and the third region and the piezoelectric vibration element overlap with each other in a plan view when viewed from the exposed surface side of the cover panel.

8. An electronic apparatus according to claim 7, wherein occupancy ratio of the first region to the whole rear surface is smaller than occupancy ratio of the second region to the whole rear surface.

9. An electronic apparatus according to claim 7, wherein the cover panel is made of sapphire crystal.

10. An electronic apparatus according to claim 7, wherein the cover panel is formed by bonding a sapphire board and a glass board, the exposed surface is a surface of the sapphire board, and the sapphire board is exposed from the first region of the rear surface.

11. An electronic apparatus according to claim 7, wherein the electronic apparatus further comprises a reinforcing member located in a region facing the first region on the exposed surface to reinforce the cover panel from the exposed surface side.

12. An electronic apparatus according to claim 7, wherein the electronic apparatus further comprises a blindfold member located in a region facing the first region on the exposed surface to conceal the piezoelectric vibration element from the exposed surface side.

* * * * *